(No Model.) 9 Sheets—Sheet 1.
C. P. CASE.
ROTARY ENGINE.

No. 496,856. Patented May 9, 1893.

Fig. 1

WITNESSES:
INVENTOR
Charles P Case
BY
ATTORNEY.

(No Model.)  9 Sheets—Sheet 2.
C. P. CASE.
ROTARY ENGINE.

No. 496,856. Patented May 9, 1893.

WITNESSES:

INVENTOR
Charles P. Case.
BY
ATTORNEY (No Model.) 9 Sheets—Sheet 4.

C. P. CASE.
ROTARY ENGINE.

No. 496,856. Patented May 9, 1893.

Fig. 4

WITNESSES:
C. C. Burdine
Hubert Peck

INVENTOR
Charles P Case
BY
O. E. Duff
ATTORNEY.

(No Model.)  9 Sheets—Sheet 7.
C. P. CASE.
ROTARY ENGINE.

No. 496,856. Patented May 9, 1893.

WITNESSES:
C. C. Burdine
Hubert Peck

INVENTOR
Charles P. Case.
BY
ATTORNEY (No Model.) 9 Sheets—Sheet 8.
C. P. CASE.
ROTARY ENGINE.
No. 496,856. Patented May 9, 1893.

UNITED STATES PATENT OFFICE.

CHARLES P. CASE, OF ALBANY, ASSIGNOR TO THE CASE ROTARY ENGINE COMPANY, OF ELMIRA, NEW YORK.

ROTARY ENGINE.

SPECIFICATION forming part of Letters Patent No. 496,856, dated May 9, 1893.

Application filed June 6, 1892. Serial No. 435,782. (No model.)

*To all whom it may concern:*

Be it known that I, CHARLES P. CASE, of Albany, in the county of Albany and State of New York, have invented certain new and useful Improvements in Rotary Engines; and I do hereby declare that the following is a full, clear, and exact description of the invention, which will enable others skilled in the art to which it appertains to make and use the same, reference being had to the accompanying drawings, and to the letters and numerals of reference marked thereon, which form part of this specification.

This invention relates to certain improvements in rotary engines.

The object of the invention is to provide an improved rotary engine exceedingly cheap, simple and durable in construction, and composed of a minimum number of parts arranged and combined so as to be sure, positive and effective in action.

A further object of the invention is to provide a rotary engine wherein a maximum amount of work and power is produced with a minimum quantity of steam by utilizing the full power of the steam and preventing waste thereof and undue friction.

A further object of the invention is to provide an improved rotary steam engine wherein the friction is reduced to a minimum and all waste and leakage of steam is prevented.

A further object of the invention is to provide an improved rotary engine wherein the use of ordinary packing and stuffing boxes is obviated and the steam is utilized to prevent leakage by holding the parts together and in place, so as to form steam tight joints without friction of any consequence and to equally distribute the steam within the casing and engine so as to cause equal expansion of all parts throughout, and to maintain the parts heated and to prevent rapid condensation in the working cylinder.

A further object of the invention is to provide an improved reversible rotary engine so constructed and arranged that it can be quickly reversed without undue wear or injury to the parts, and in a simple manner.

A further object of the invention is to provide an improved rotary engine so constructed and arranged that it can be easily and quickly reversed while in action and which shall be provided with improved means whereby certain parts are held yieldingly in position, so as to yield, when the engine is suddenly reversed, and thereby prevent jamming or injury of parts.

A further object of the invention is to improve certain details of construction and arrangements of parts whereby an engine of high efficiency is produced.

The invention consists in certain novel features of construction and in combinations of parts more fully described hereinafter and particularly pointed out in the claims.

Referring to the accompanying drawings.

In the drawings the reference letter $a$, indicates the inclosing shell or casing of the engine provided with suitable supporting standards or beams.

$b$, indicates the live steam induction pipe or opening. The steam passes through this pipe into the steam chambers $c$, in the casing around all the working parts of the engine so as to heat all the parts equally on all sides, and prevent condensation of the steam in the working cylinder. This is a feature of importance for where the exterior of the cylinder and other working parts is exposed to the air they become cool and condense the steam. The rear end of the casing is closed by plate $d$, and the front end of the casing is closed by head $e$. This head $e$ is hollow and provided with the internal steam chamber $f$ into which the live steam is discharged from chambers $c$ through the pipe $g$.

$h$, indicates the piston wheel rotating in the steam chamber $i$. This piston wheel is provided with the piston bars or heads $j$, rigid therewith and projecting radially therefrom and fitted sufficiently close in the steam chamber to move with a minimum amount of friction and yet so that steam will not escape by the same. The steam passes from chamber $f$ in the head $e$ into the open end of the cylindrical steam chest or sleeve $k$ located within the piston wheel. This steam chest is provided with the oppositely located steam induction ports $l$, adapted to register with the steam induction ports $m$, or $n$, as the case may be through the piston wheel into the steam chamber or cylinder behind the piston bars. The engine here shown is provided with two diametrically opposite piston heads or bars $j$.

A cut off is located within the piston wheel, and as here shown consists of the rigid sleeve $o$, embracing the outer portion of the steam chest $k$ and screwed into threaded portion $p$, of the head $e$ and provided with the arm $q$ extending along the steam chest beside the ports $l$, therein so as to close said ports when the steam chest is turned in a direction to bring the ports beneath said fixed arms $q$. The other portion of the cut off consists of the sleeve $r$ embracing the rear end of the steam chest and provided with the arms or valves $s$, extending forwardly over the steam chest parallel with the ports $l$, so that they can move over the surface of the steam chest between the rigid valves or arms $q$. These valves $s$ regulate the quantity of steam admitted behind the piston bar at each stroke and also entirely cut off the supply of steam when the sleeve $r$ is rotated in a direction to swing the valves $s$, against their respective rigid stops or arms $q$ to thereby close the ports $l$.

Suitable means hereinafter described are provided to operate the cut off.

Figure 1:
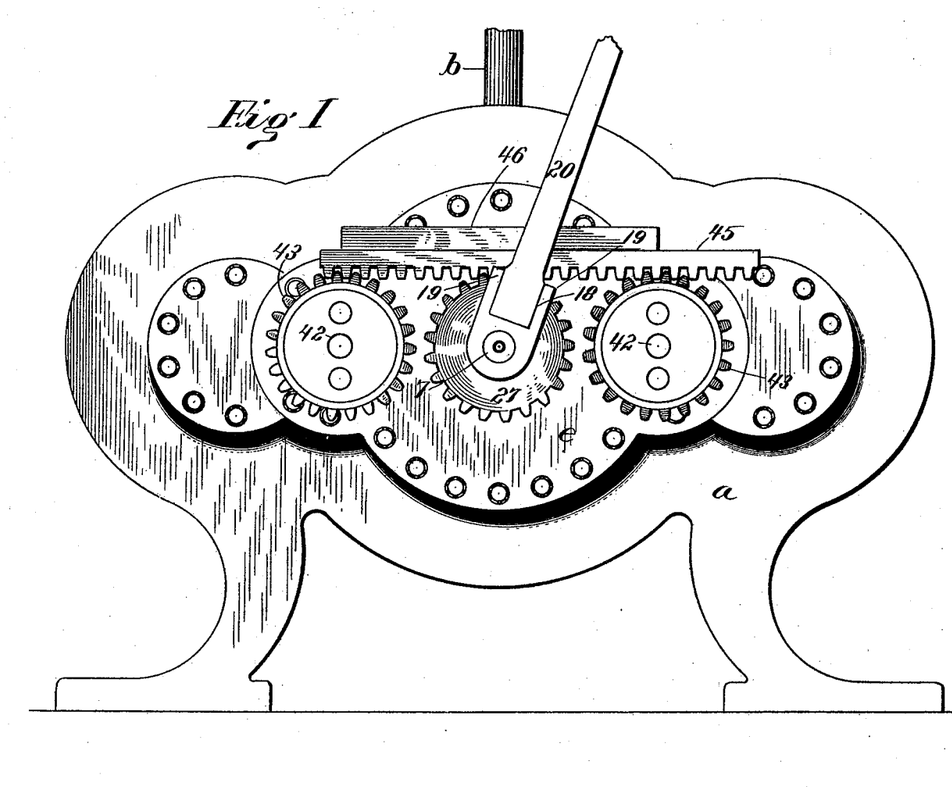
—
Figure 1 is an end elevation of my improved reversible rotary engine.
Figure 2:
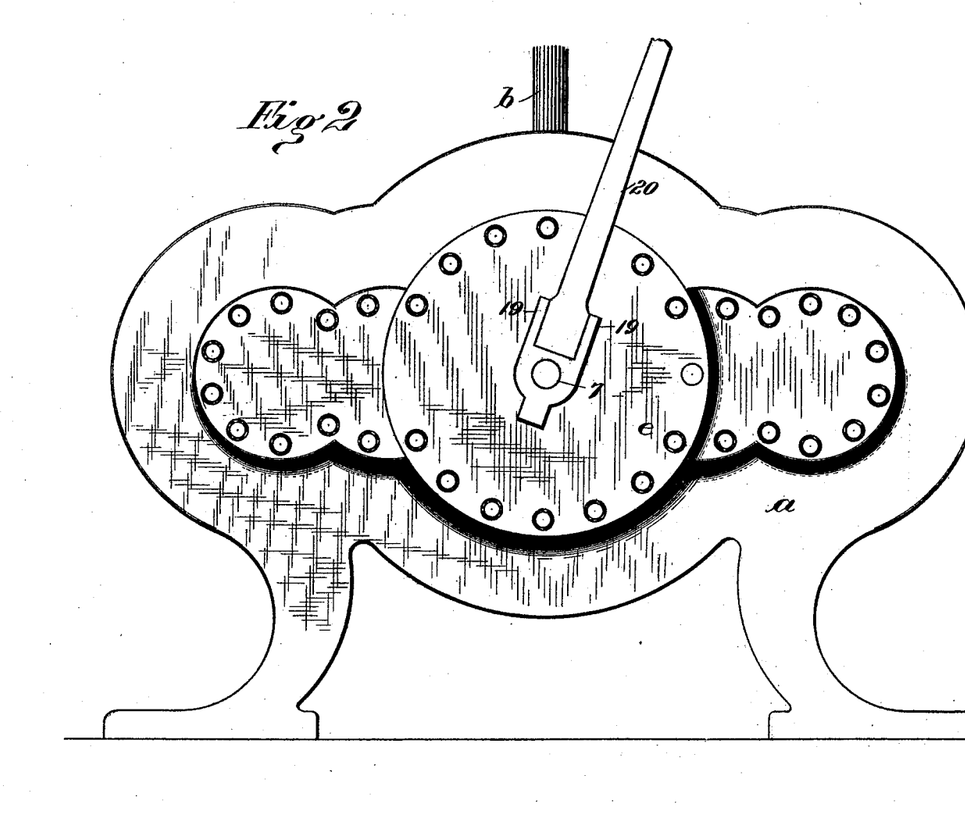
Fig. 2 is an end elevation of a non reversible engine constructed in accordance with my invention.
Figure 3:
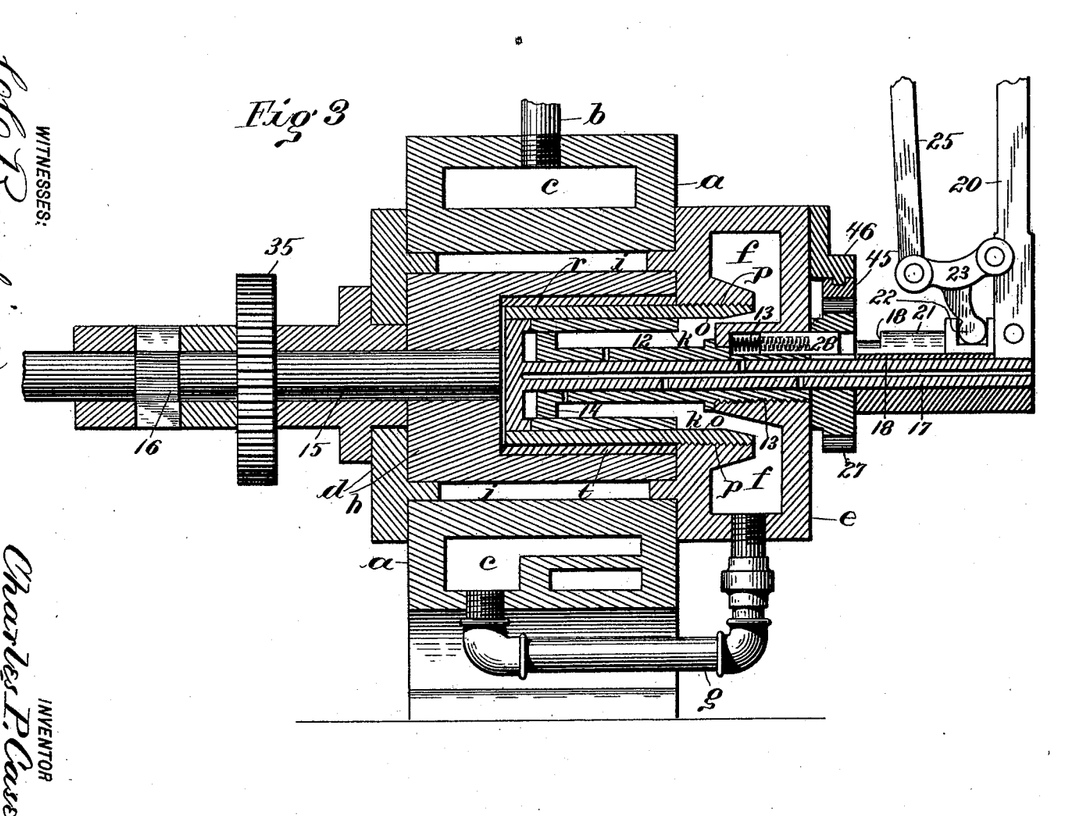
Fig. 3 is a central longitudinal section of the reversible engine.
Figure 4:
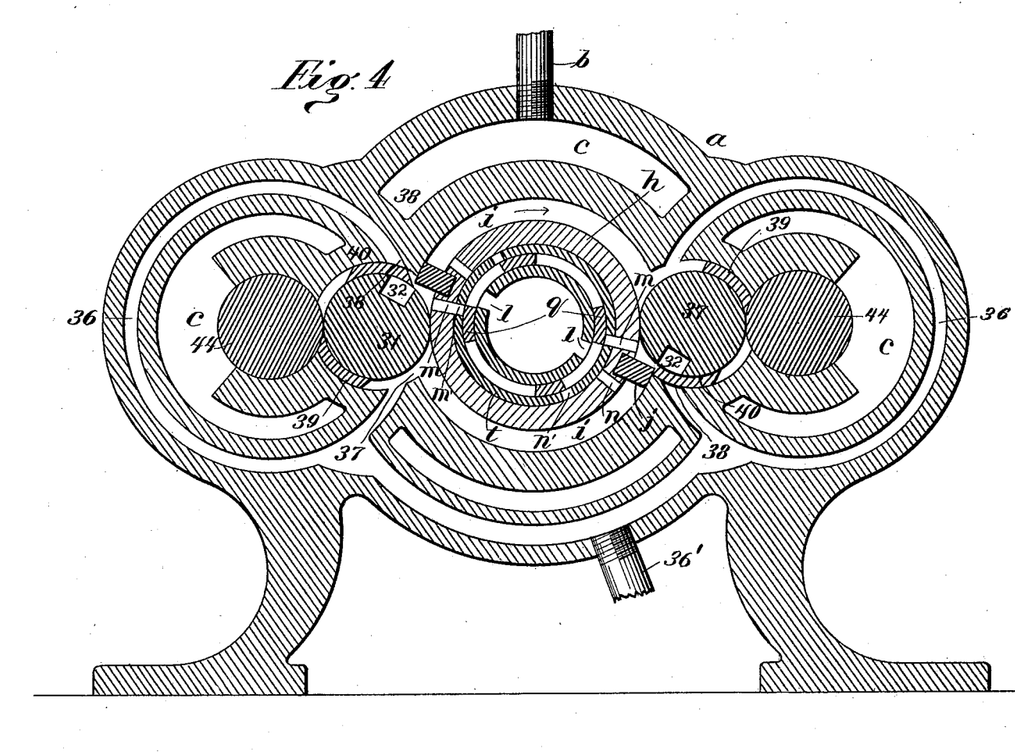
Fig. 4 is a cross sectional view of the reversible engine taken in the plane of lines x—x Fig. 5.
Figure 5:
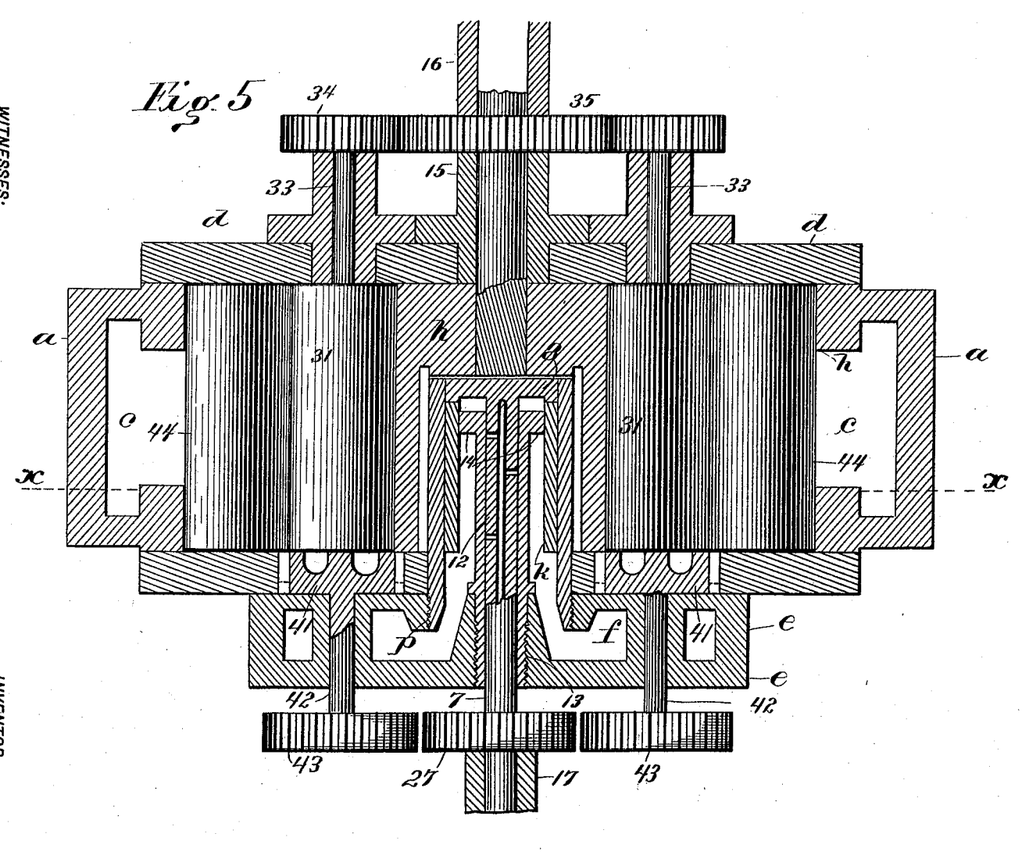
Fig. 5 is a horizontal sectional view of the reversible engine.
Figure 6:
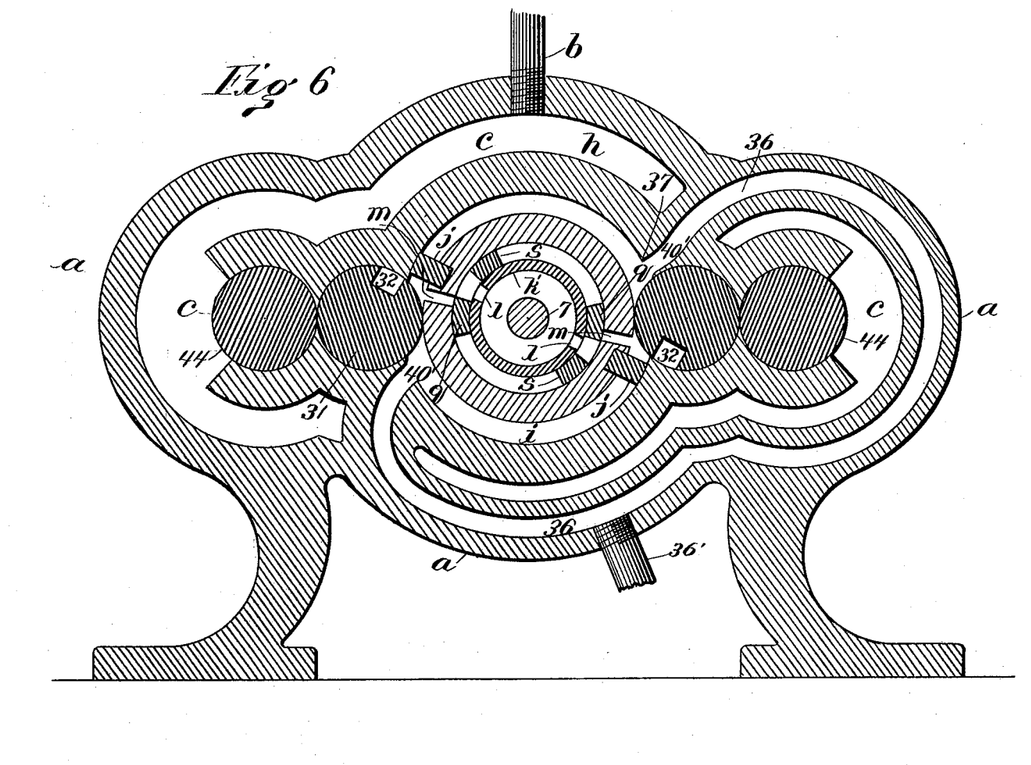
Fig. 6 is a cross section of the non reversible engine.
Figure 7:
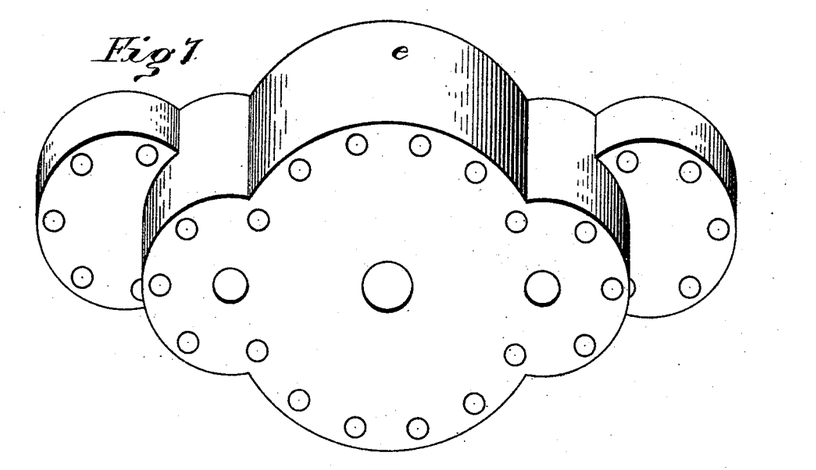
Fig. 7 is a detail view of the front head of the reversible engine.
Figure 8:
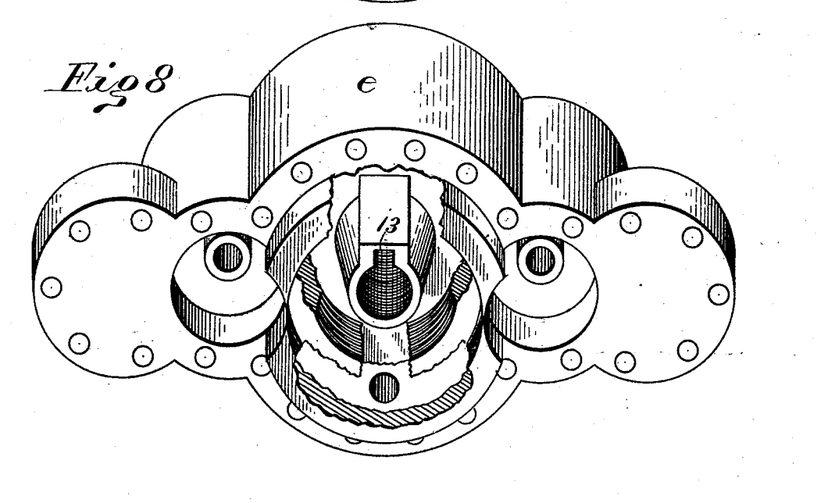
Fig. 8 is a detail perspective of the inner side of the front head, parts being broken away.
Figure 9:
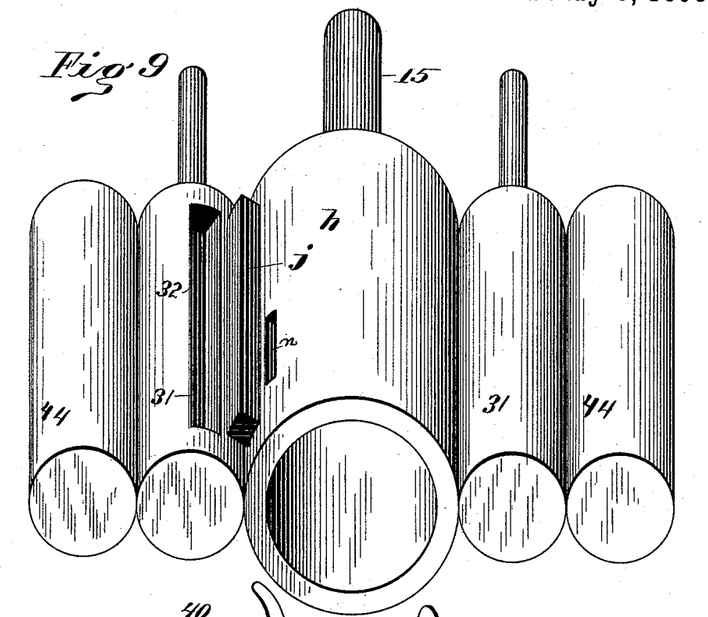
Fig. 9 is a detail perspective showing the piston wheel, the rotary abutments, and the rotary packing rollers.
Figures 10, 11, 12, 13:
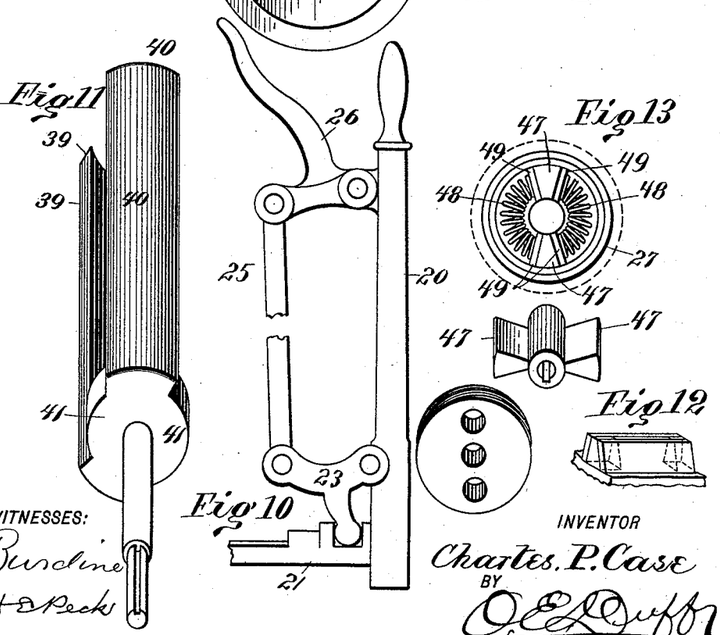
Fig. 10 is a detail elevation showing the throttle or cut-off lever provided with the reversing attachments.
Fig. 11 is a detail perspective of the exhaust valve employed in the reversible engine.
Fig. 12 shows separated and in perspective a gear and the parts connecting the same with its exhaust valve to yieldingly connect the exhaust valve with its operating mechanism, so that the exhaust valve can give and relieve the steam pressure during the reversal of the engine when in action.
Fig. 13 is another detail view of the parts of Fig. 12 showing them assembled.
Figures 14, 15, 16, 17, 18, 19, 20, 21, 22, 23:
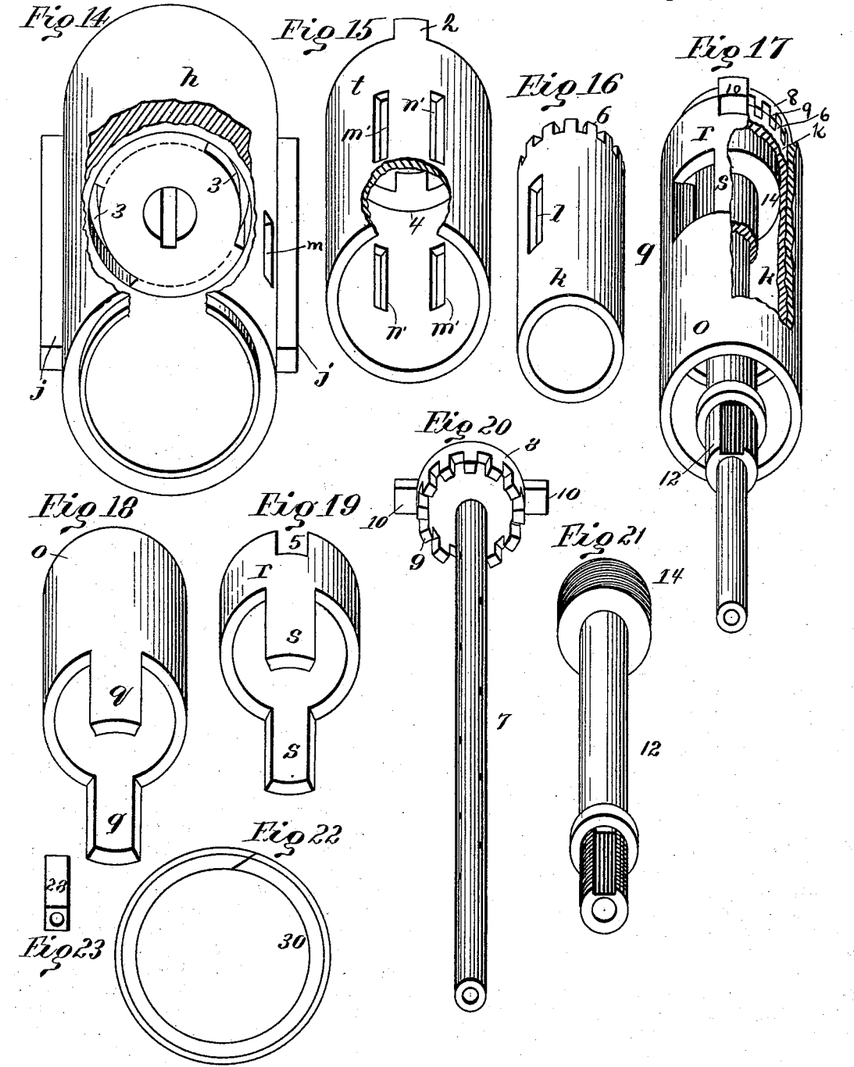
Fig. 14 is a detail view of the piston wheel partially broken away.
Fig. 15 is a detail view partially broken away of the port reverser or cylindrical lining mounted concentrically with piston wheel.
Fig. 16 is a detail view of the inner sleeve or what may be termed the steam chest shown in this view constructed for the reversible engine, wherein it controls the admission of steam to the proper sides of the abutments.
Fig. 17 is a detail perspective showing this steam chest, the cut off valves mounted thereon, and the operating shaft, and the head closing the inner end of the steam chest parts being broken away.
Figs. 18 and 19 illustrate, respectively, the fixed and movable parts of the cut off valves.
Fig. 20 illustrates a portion of the shaft which operates the cut off valves and the port reversing sleeve, and steam chest.
Fig. 21 illustrates the head closing the inner end of the steam chest and the sleeve carrying the same.
Fig. 22 is a detail view of the packing ring.
Fig. 23 is a detail view of the spring lock holding the main reversing gear.

$t$, is the reversing sleeve or cylinder mounted within the piston wheel around the cut off mechanism just described and provided with two sets or ports $m'$ and $n'$ adapted to register respectively with the ports $m$ and $n$, on opposite sides of the piston bars. As shown in Fig. 4 the piston wheel is traveling in the direction of the arrow and the ports $m'$, of the reversing sleeve are registering with the ports $m$ of the piston wheel, and the ports $n$ of the piston wheel on the opposite side of the piston bars are closed by the reversing sleeve $t$. The reversing sleeve is fitted within the piston wheel and is provided with lugs 2, projecting into segmental slots 3, in the closed end of the piston wheel. These slots are of sufficient length to throw the reversing sleeve so that ports $n'$ and $m$ will register and ports $m'$ and $m$, will be closed or vice versa. This reversing sleeve $t$, is provided with an internal shoulder 4. The rear end of the movable portion $r$, of the cut off is provided with diametrically opposite recesses 5, and the rear end of the steam chest is provided with gear teeth or notches 6.

7, indicates the shaft extending through the head $e$, from the exterior of the machine to the rear end of the steam chest. At its rear end this shaft 7 is provided with a disk 8 with teeth 9, adapted to mesh with the teeth 6, of the steam chest; and is also provided with the lateral lugs 10 fitting in the notches 5 of the cut off valve and extending behind the shoulder 4, of the reversing sleeve. Suitable means are provided to draw this shaft outward when it is desired to reverse the machine. This action throws teeth 9, and 6, into engagement and draws lugs 10 against shoulder 4. The shaft 7, is then turned which action throws the cut off valve $s$, over the ports $l$ and shifts the steam chest so as to throw the ports $l$, to the opposite sides of the fixed points $q$, and thereby feed the steam to the proper sides of the abutments 11, and the lugs 10 pressing against the shoulder 4, retard the movement of the reversing sleeve so that it does not revolve as fast as the piston wheel, hence, both sets of ports in the piston wheel will be momentarily closed preventing access of fresh steam and the opposite set of ports $n$, $n'$, will register, thereby admitting steam to opposite sides of the piston bars. The reversing sleeve controls the ports which discharge steam to the proper sides of the piston bars.

12, indicates a sleeve at its outer end screwed into the opening 13 in the head e and surrounding loosely the shaft 7, and at its inner end provided with the inner head 14 closing the interior of the steam chest. This head can be provided with a suitable number of spring rings sprung unto the head so as to form a steam tight joint at the inner end of the steam chest. The pressure of the steam against said head forces it to its proper position maintaining a tight joint and preventing leakage of steam beyond the rear end of the steam chest. The rear end of the piston wheel $h$ is preferably solid and closed and the driving shaft 15 for transmitting the power from the engine is suitably keyed or otherwise secured therein and journaled in the rear plate $d$, of the machine. The outer end of this driving shaft can be provided with a clutch 16, or other suitable means for coupling or uniting the driving shaft with the machinery to be driven.

Suitable means is provided to operate the cut off and reversing shaft 7. If desired this means can consist of the sleeve 17 clamped or otherwise secured on the outer end of the shaft 7, and provided with the groove or way 18, and the ears 19. The cut off lever 20 is at its lower end mounted between the ears 19 to turn the shaft 7. This cut off shaft has the movable key 21, adjustably confined to its lower end and sliding in the way 18. A knuckle joint 22, is provided to move the said key longitudinally in the way 18; the said joint in this case, consisting of the angle lever 23, having one end loosely extending into a recess in the key or slide and one end pivoted to the lever 20 and its outer end pivotally connected by rod 25 with the outer end of the spring clip or handle 26, thus when the clip is pressed to the lever 20 the key will be forced longitudinally in the way 18, so as to enter a slot in the main reversing gear 27, loosely mounted on said sleeve and thereby lock the gear to turn with the cut off lever when rocked.

28, indicates a spring lock or block sliding on the flattened surfaces at the end of the sleeve 12 and in opening 13 and entering the slot in the gear wheel 27 and normally locking said gear wheel against rotation. When the spring clip is operated to move the sliding key said key engages said spring block and forces it out of the gear wheel and to its solid seat and then the continued pressure of the sliding key forces the shaft 7, outwardly and performs the functions before described. If it is desired to cut off the engine and stop the same the lever 20 should be rocked without operating the sliding key which action will operate the cut off valves only through the medium of the lugs 10, 10, and notches 5, 5. The amount of steam admitted behind each piston bar can be regulated by moving the cut off valves by means of the cut off lever and shaft, toward the rigid arms or portions $q, q$. As the parts are located in Fig. 4 live steam will be admitted to the piston bars while the ports $m, m'$, are traveling from arm $q$, to arm $s$, the expansion of the steam will carry the piston bars the remainder of the distance to the exhaust ports, thereby the full force of the steam is utilized and the steam will not be wasted by blowing off at the exhaust under high pressure but will merely flow out under just sufficient pressure to carry it off. If desired one or both ends of the piston wheel can be rabbeted and concave split expansible packing rings 30 can be sprung into said rabbeted portions to prevent steam leaking around the ends of the piston wheel.

31, 31, indicate the rotary abutments here constructed in the form of rollers or cylinders mounted in suitable openings in the casing so as to revolve in contact with the piston wheel. The piston wheel and said rotary abutments have smooth engaging surfaces so that there will be a minimum amount of friction. The abutments are provided with the slots or openings 32, to register with the piston bars and permit the piston bars to pass the abutments by entering said slots or recesses 32. These recesses being formed of sufficient size to permit the entrance and passage of the piston bars without undue rubbing or knocking of the parts together. It should be observed that the piston wheel and the rotary abutments are formed longer than the piston bars and recesses 32, so that steam cannot leak around the ends of the piston bar. The front ends of the rotary abutments are preferably cut off square while the rear ends thereof are provided with shafts 33, extending through and mounted in the rear plate and at their outer ends provided with gear wheels 34, meshing with a gear 35, rigid on the end of the shaft. By means of these gears the rotary abutments and the piston wheel are always maintained in the proper relative position so that the piston bars will always register with the recesses 32, therefor in the abutments and thereby prevent possible disarrangement of parts and consequent injury.

36, indicates the exhaust passages extending to the exhaust pipe 36'.

37, 37, and 38, 38, indicate the two pairs of exhaust ports from the steam cylinder or chambers in which the piston bars work. Exhaust ports are located on opposite sides of these rotary abutments and at opposite ends of each steam chamber in which the piston bars slide. These ports are controlled by the exhaust port valves 39, 40. Each pair of valves 39, 40, consists of a head 41, mounted at the front end of each rotary abutment in the front head of the engine and provided with the shaft 42, extending forwardly through the front head and at its outer end provided with gears 43, yieldingly connected therewith as hereinafter described. The valve arms 39, 40 extend from each head 41 over the surface of the rotary abutments so as to slide in the space between the periphery of the rotary abutments and the wall of the casing to close or open the exhaust ports in proper sequence. The operating parts and connections for these exhaust port valves are so arranged that when the valves 40 close the exhaust ports 38, the valves 39 will be located back on their respective abutments, thereby opening the exhaust ports 37 as shown in Fig. 4. These valves 39, and 40 have smooth surfaces which easily slide with a minimum amount of friction between the surfaces of the casing and the rotary abutments.

44, 44, indicate packing rollers or cylinders mounted in suitable chambers or stations in the casing with their ends abutting against the front head and rear plate of the casing and bearing on their inner sides against the outer sides of the rotary abutments. The outer sides of these packing rollers extend into the steam spaces c, so that the full force of the live steam in said spaces is exerted on said rollers to press them against the rotary abutments and thereby press the rotary abutments to the piston wheel, hence preventing leakage of steam. These rollers rotate as idlers by frictional contact with the rotary abutment and have smooth surfaces so that there is a minimum amount of friction as there is no slipping or sliding between the abutments and said packing rollers or the abutments and the piston wheel.

45, indicates a rack bar mounted in suitable bearing or arm 46 secured to the front head and meshing with the gears 43, and the main gear on the shaft 7, thus, when the shaft 7, is rocked by the throttle lever after the gear 27 has been thrown into engagement with the rack 45, said gear 27 will move the rack 45, and consequently rotate the gears 43 in a direction to reverse the exhaust ports, that is open one set of ports and close the other set of ports at the same time that the steam inlet ports in the piston wheel are reversed to admit the steam on opposite sides of the piston bars and the abutment. The action is automatic and all parts work in proper order and sequence so that the desired result is attained without jarring or knocking of parts or injury to the engine in any wise.

If the exhaust port valves and other parts were rigidly secured and connected injury and wear to the parts would be occasioned by a sudden reversal of the engine when running at a high rate of speed under a heavy pressure of steam. To avoid this difficulty a yielding connection is formed between the exhaust port valves and their operating means, so that when the engine is reversed when running under heavy pressure, the exhaust port valves can spring back and thereby relieve the high pressure of steam and allow it to escape through the exhaust ports about to be closed. By this means all injury to the parts and jarring and noise is prevented so that the engine, can be easily, quickly and smoothly reversed at any time. This yielding connection is formed by mounting the gears 43, loosely on the shafts 42 and connecting them thereto by a spring connection. To accomplish this end the gears 43 are formed hollow and with elongated hubs. A sleeve is rigidly mounted on the shaft 42 in each hub and is provided with lateral wings or lugs 47. Coiled or other springs 48 of a suitable tension and power are interposed between the lugs 47 and suitable stops in said hubs of gears 43, so that the gears 43 will rotate the shafts 42 so long as the pressure on the shafts 42 does not exceed the tension of the springs 48, but when the steam pressure on the edges of the valves 39 or 40, exceed the tension of springs 48, said springs will be contracted between stops 49 and lugs 47, thereby allowing said valves to spring back beyond the exhaust ports and thereby allow the excessive steam pressure to relieve itself and pass off through the exhaust ports. When the steam pressure in front of the piston bars has thus been relieved the exhaust port valves will be returned to their proper positions by said springs 48. These springs can be formed to relieve or compress at a certain degree of steam pressure. This is a point of great advantage as it assists in rendering the engine reversible and of a high degree of efficiency and superiority.

The non reversible or single acting engine shown has but two exhaust ports 40' and is not provided with the exhaust port closers, but the rotary abutments are directly mounted in bearings formed in the casing. Furthermore the steam chest $k'$ is rigidly mounted and the piston wheel is not provided with the reversing sleeve $t$, of the reversing engine. The reversing attachment carried by the cut off or throttle lever also is dispensed with in the non reversible engine and the shaft 7 is merely provided with a lever for rocking it and the cut off valve which are operated in the same manner as in the reversible engine, the shaft 7 in the non reversible engine being mounted against longitudinal movement.

The sensitive arm of the governor may be attached to the cut off lever and said cut off be employed to control the quantity of steam required by the varying power of the engine according to the resistance exerted by the work the engine has to do.

It is evident that various slight changes might be made in the form, arrangement and construction of the various parts described without departing from the spirit and scope of my invention, hence I do not wish to limit myself to the precise construction herein described, but consider myself entitled to all such changes as fall within the spirit and scope of my invention.

Having thus fully described my invention, what I claim, and desire to secure by Letters Patent of the United States, is—

1. In a rotary engine, the combination of the piston wheel having radial exit ports, an internal steam chest having radial exit ports, the cut-off steam supply regulating valves located between the chest and wheel, and a controlling shaft extending through the steam chest and connected at the rear end of the chest with said valves, substantially as described.

2. In combination, the casing, the annular steam cylinder within the same having exhausts and abutments, the piston wheel within the same having the exterior pistons in said cylinder and the internal steam chest having eduction ports to said cylinder and the outer open end, the hollow casing head opening into and closing said chest, and steam passages through the casing into said head, substantially as described.

3. A rotary engine having its piston wheel provided with pistons, radial eduction ports in the piston wheel on opposite sides of the pistons, the port changer in said wheel to throw the ports to either sides of the pistons, the steam chest within the piston wheel having radial eduction ports and movable to throw the steam to either sides of the abutments, and cut offs and a shaft and lever arranged to operate said parts separately or simultaneously.

4. The rotary engine having its piston wheel provided with an internal steam chest having exit ports and radial eduction ports on opposite sides of its pistons, and the port changing sleeve located within and rotating with the wheel around the chest and arranged to throw the steam from the chest to either side of each piston the cut off valves controlling the ports from the steam chest, and a controlling shaft connected to operate said valves and sleeve, substantially as described.

5. In a rotary engine, the piston wheel having the pistons and internal steam chest having eduction ports and eduction ports in the piston wheel opening on opposite sides of each piston bar and adapted to receive steam from said ports of the chest, and the cylindrical lining fitted in the interior of the piston wheel to rotate there with and provided with two sets of ports to alternately close one set of ports in the piston wheel and open the other set, and a shaft provided with means to retard the movement of said sleeve independent of the piston wheel to operate said sleeve or lining to reverse said ports.

6. A rotary engine having the piston wheel open at one end and closed and provided with the drive shaft at the other end and provided with the internal steam chest formed of a cylinder open at the ends, the internal head closing and located in the inner end of said chest the main head of the casing closing the outer end of the chest and of the wheel, and a sleeve secured in said casing head and extending through the chest and at its inner end carrying said internal head.

7. In a rotary engine, the combination of the piston wheel having the internal steam chest provided with radial ports, the piston wheel provided with exterior pistons and with radial ports, and the cut off interposed between said chest and said wheel and consisting of the stationary arms or portions and the valves movable over the face of the steam chest between said stationary parts to regulate the quantity of steam admitted or to close the ports in the steam chest, and a shaft having lateral arms connected and arranged substantially as described for operating said valves.

8. A rotary engine provided with the rotary piston wheel having the internal independently turnable steam chest for the purpose set forth and the independently turnable sleeve for reversing ports, and the cut off and controlling valves, and mechanism for operating these parts, as set forth.

9. In a rotary engine, the piston wheel provided with the pistons and radial ports and having the internal steam chest having radial ports to supply steam to said piston wheel ports, and the cut off interposed between said chest and said wheel and consisting of the sleeve rigidly secured and provided with the arms extending over the chest beside the ports therein, and the movable sleeve turnable on the chest and having the arms moving over the chest between said stationary arms, and the shaft extending through the chest and connected with said movable sleeve to operate the same.

10. The rotary engine having the casing provided with a live steam passage within the same, the piston wheel in said casing having the internal steam chest, the hollow casing head opening into said chest, a connection from said live steam passage to said head, and the exhaust steam passages within the casing from the steam space around said wheel, said live and exhaust steam passages inclosing the working parts of the engine.

11. In combination, the piston wheel having ports, the port reversing sleeve therein having ports, the steam chest within said sleeve having ports, the cut off between said chest and said sleeve and consisting of the stationary portion and the movable valves carried by a sleeve, and the shaft, movable longitudinally, within the steam chest connected to said movable sleeve of the cut off to operate the same and provided with means to operate said reversing sleeve and rotate said chest when the shaft is moved longitudinally and turned.

12. In a rotary engine, the combination of the port reversing mechanism for the piston wheel with the exhaust port reversing mechanisms moving on the abutments.

13. In a rotary engine, the rotary abutment having exhaust ports on opposite sides thereof, and the exhaust port valves moving on the abutment to alternately close and open the ports on opposite sides of the abutment, substantially as described.

14. In a rotary engine, the combination of the piston wheel and its pistons, port reversing gear therefor, the abutments having exhaust ports on opposite sides thereof and port controlling and reversing gear therefor connected and operating with the port reversing gear for said piston wheel.

15. In combination, the piston wheel having the pistons and a cylinder in which the same rotate, the abutments exhaust ports from said cylinder on opposite sides of each abutment, and a pair of connected valves for each pair of exhaust ports moving on the abutments to control the said ports, and means, substantially as described to operate said valves, and port reversing mechanism for the steam inlet ports.

16. The combination, of the piston wheel and means for driving the same, the rotary abutments, exhaust ports on opposite sides thereof, the exhaust port controlling valves each consisting of a head on one end of an abutment having the arms extending longitudinally of and movable on the abutments to operate as set forth and the shafts extending outwardly from said heads and connected by gearing to operate together and with the inlet port reversing mechanism.

17. In a rotary engine, the combination of the inlet port reversing mechanism, the exhaust port reversing valves, actuating mechanism for operating said inlet port reversing mechanism and said valves, and spring or yielding connections interposed between said operating mechanism and said valves.

18. In a rotary engine, the combination of the inlet port reversing mechanism comprising movable sleeves and valves, and the exhaust port reversers comprising movable valves, shafts for actuating said parts and gearing connecting said shafts to cause them to move in unison.

19. In a rotary engine, the combination of the inlet port reversing mechanism, a shaft controlling the same, the exhaust port controlling mechanism, shafts controlling the same, gearing connecting said shafts to operate together, the gears on the exhaust port shafts being yieldingly mounted, and a lever on the inlet port controlling mechanism shaft.

20. In a rotary steam engine, the combination of the exhaust port reversing mechanism, operating mechanism therefor comprising shafts and gears, the gears having hollow hubs provided with internal lugs, lugs rigid with the shafts and springs interposed between the gear and the shaft lugs, as and for the purposes set forth.

21. In a rotary engine, the combination with the inlet port reversing mechanism, the exhaust port reversing mechanism, a shaft controlling the inlet port reversing mechanism, a gear wheel normally loose on said shaft, a spring lock for said wheel, a controlling lever on said shaft, a key longitudinally movable on said shaft by means carried by said lever and adapted to disengage said lock and lock said gear to the shaft, and gearing from said gear to the exhaust port controllers.

22. In a rotary engine, the combination of the reversing valves, the shaft having means to turn said valves, a lever on the outer end of said shaft, said shaft mounted in the front head of the engine, the piston wheel in which said shaft is centrally located, a sleeve on said shaft and the inner head of said wheel carried by said sleeve, substantially as described.

In testimony that I claim the foregoing as my own I affix my signature in presence of two witnesses.

CHARLES P. CASE.

Witnesses:
O. E. DUFFY,
HERBERT E. PECK.